INVENTOR.
CHARLES H. BERGSLAND
KARL E. NEUMEIER
PAUL S. PETERSEN
BY William C. Stueber
ATTORNEY FIG. 4
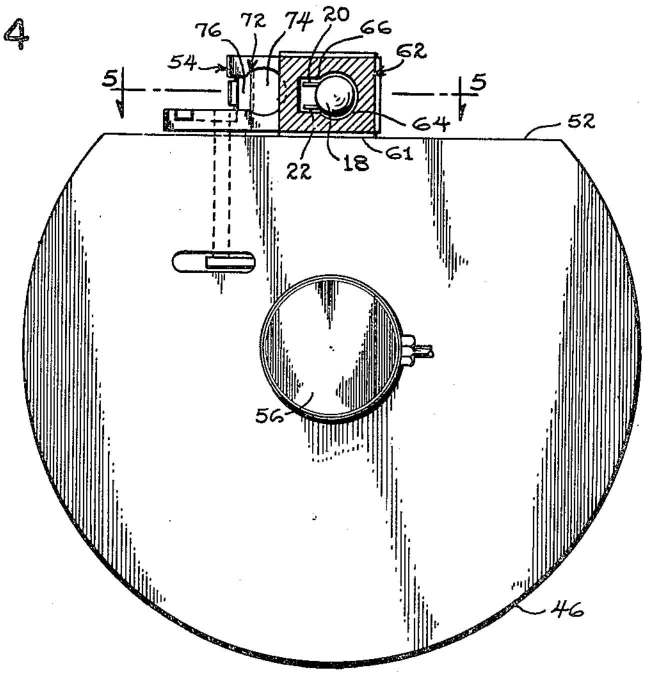
FIG. 5 FIG. 6
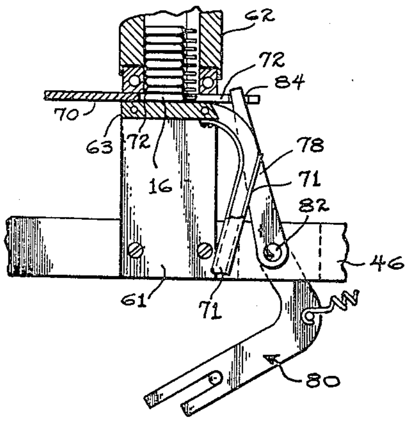
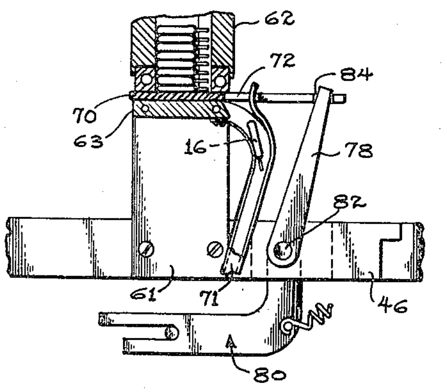
INVENTORS
CHARLES H. BERGSLAND
KARL E. NEUMEIER
PAUL S. PETERSEN
BY William C. Stueber
ATTORNEY Aug. 23, 1960 C. H. BERGSLAND ET AL 2,949,665

DISC CAPACITOR INSERTER

Filed Oct. 14, 1955 5 Sheets-Sheet 3

INVENTORS
CHARLES H. BERGSLAND
KARL E. NEUMEIER
PAUL S. PETERSEN

BY William C. Stueber
ATTORNEY

INVENTORS
CHARLES H. BERGSLAND
KARL E. NEUMEIER
PAUL S. PETERSEN

BY *William C. Stueber*
ATTORNEY

Aug. 23, 1960 C. H. BERGSLAND ET AL 2,949,665

DISC CAPACITOR INSERTER

Filed Oct. 14, 1955

5 Sheets-Sheet 5

INVENTORS
CHARLES H. BERGSLAND
KARL E. NEUMEIER
PAUL S. PETERSEN

BY William C. Stueber

ATTORNEY 2,949,665

DISC CAPACITOR INSERTER

Charles H. Bergsland and Karl E. Neumeier, Stillwater, and Paul S. Petersen, St. Louis Park, Minn., assignors to General Mills, Inc., a corporation of Delaware Filed Oct. 14, 1955, Ser. No. 540,541

1 Claim. (Cl. 29—203)

The present invention relates to improvements in mechanism for automatically assembling components of electrical circuitry and more specifically to mechanism for attaching a component such as a disc capacitor to a printed circuit board.

Developments have been made in the art of assembly of electrical circuits which reduce the cost of producing or assembling electrical circuitry and which improve the quality of such assembly. These improvements include the use of circuit boards which are formed of a board of insulating material having a network of circuitry attached to its surface. The circuitry consists of strips of conducting material which may be attached by printing, spraying, etching, embedding, or by other means known to the printed circuit art.

In completing the circuit of these boards, the boards are usually provided with holes into which are inserted the leads from electrical components such as resistors, condensers, transformers, transistors, diodes and the like. Advancements in the art of assembling this equipment have included providing automatic machines which will function to insert leads of the components into holes in the boards to thereby attach the components to the boards and complete the circuit. The leads are usually mechanically inserted and crimped and further secured to the board by soldering. This may be a dip soldering process whereby the solder adheres to the metal parts but not to the non-conducting material of the printed circuit board.

In making such automatic assembly apparatus useful to complete all types of circuits it is, of course, expedient to be able to attach mechanically and automatically all types of electrical components so that the machines may be constructed which will assemble a complete circuit of any type such as, for example, a radio circuit which requires the attachment of many types of components and components of many shapes such as resistors, are usually tubular in shape, diodes which may be flat or round in shape, condensers which may be tubular, flat, or disc shaped, etc. The present invention is embodied in a machine for attaching flat disc-like capacitors known to the electrical art as disc capacitors.

These capacitors are disc-like in shape being flat and round with a pair of spaced leads projecting parallel to each other from the peripheral edge of the disc. It will be apparent from the shape of the capacitor that a mechanism adapted to attach a tubular component, for example, cannot be used for attaching a component of a shape of the disc capacitor.

It is accordingly an objective of the invention to provide a machine which will automatically attach a series of disc capacitors to a circuit board in the proper location and in the proper orientation by forcing the leads into the holes in a circuit board.

Another object of the invention is to provide an improved mechanism for attaching disc capacitors to a circuit board which will gently handle the capacitors and will not damage them during insertion although the machine may be operated at a high speed.

Another object of the invention is to provide a mechanism for automatically attaching disc capacitors to a circuit board which will insure that both leads of the capacitor are accurately and completely inserted and will insure that the leads are properly positioned for forcing them into holes in the circuit board.

Another object of the invention is to provide a machine for automatically attaching disc capacitors which is capable of successively feeding single disc capacitors from a large supply of capacitors so that they may be handled by an inserting mechanism.

A still further object of the invention is to provide a mechanism which will feed individual capacitors from a supply magazine keeping the capacitors oriented with the leads projecting in the right direction and with the polarity of the leads remaining correct and will deliver the components from a horizontal position in the magazine to a vertical position near the circuit board with the leads projecting downwardly.

Another object is to provide an improved mechanism for holding the disc capacitor and positioning it over the circuit board before the leads are pushed into holes in the circuit board.

Other objects and advantages will become apparent in the following specification taken in connection with the appended drawings in which:

Fig. 4 is a plan view of the mechanism embodying the present invention illustrating the capacitor attaching head;

Fig. 5 is a sectional view taken along line 5—5 of Fig. 4 illustrating the mechanism for removing individual components from the bottom of the component magazine;

Fig. 6 is another view of the mechanism of Fig. 5 but showing the component moving mechanism in a different position with the capacitor being moved from the bottom of the magazine and dropping down the delivery chute;

Figures 1, 2, 3:
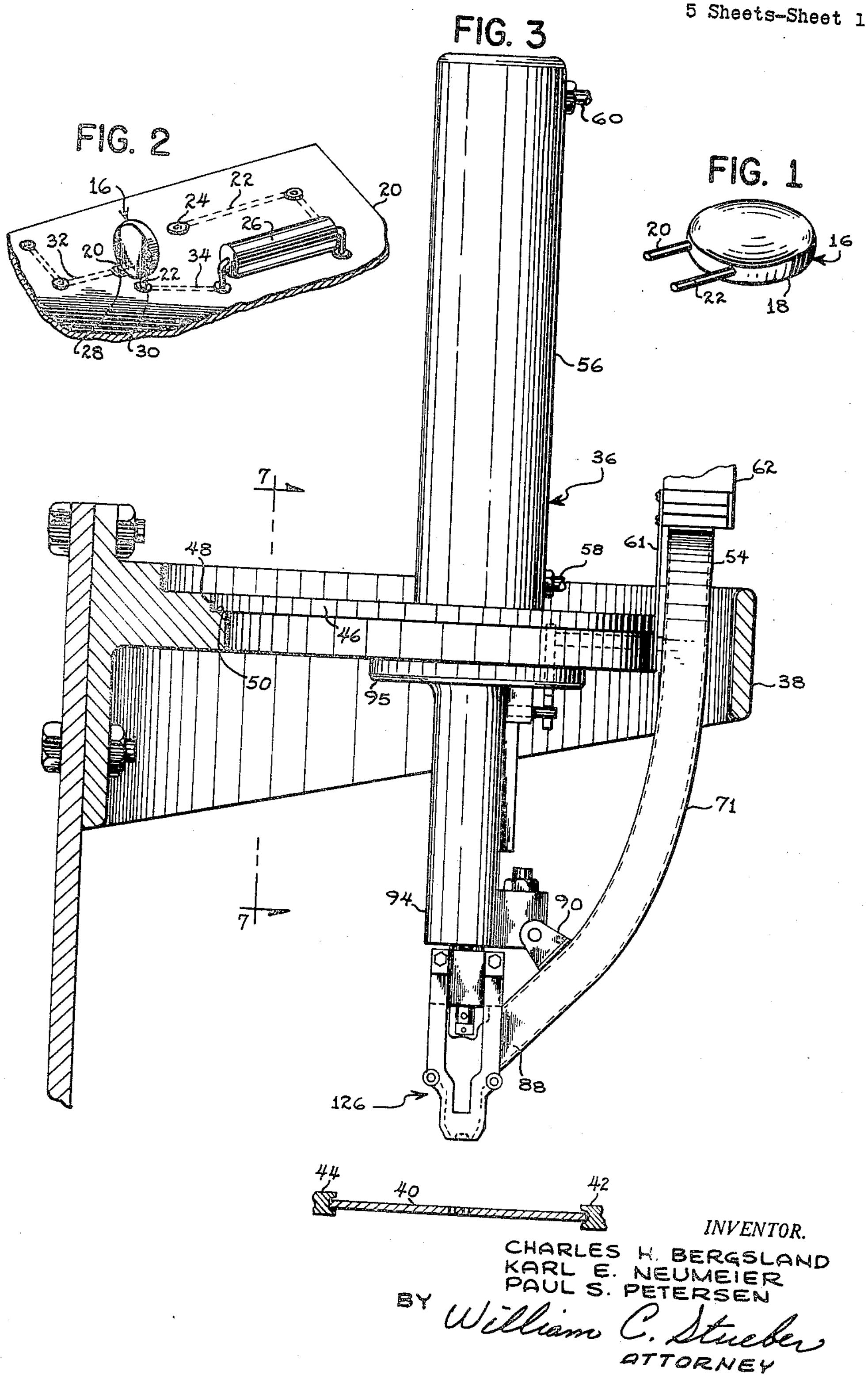
Fig. 1 is a perspective view of a disc capacitor of the type which the present machine will attach to a circuit board.
Fig. 2 is a perspective view of a section of the printed circuit board having a tubular type electrical component attached and also having a disc capacitor of the type shown in Fig. 1 attached.
Fig. 3 is a side elevational view of the disc capacitor attaching head with the frame for supporting the head being shown in section.

With special reference to Figs. 1 and 2, a disc capacitor is shown at 16 in Fig. 1 and this is of the type to be inserted or attached to a circuit board by the mechanism embodying the preferred features of the present invention. A disc capacitor is disc-like in shape having a cylindrical body portion 18 with parallel spaced leads 20 and 22 projecting from the peripheral edge of the capacitor and leading to the capacitance element within the body 18 of the capacitor.

The circuit board of the type to which the capacitor is to be attached is shown in Fig. 2. These circuit boards are of the printed circuit type having conducting strips, such as are shown at 22, 32, and 34 by the dotted lines, embedded or printed on the surface of the board 20 which is formed of a non-conducting material. The conducting strips terminate in holes such as illustrated at 24. For attaching electrical components to the board, the leads of the components are inserted into the holes and the leads may be crimped beneath the board or they may be merely soldered to the ends of the conducting strips. When crimped, a solder attachment is still generally used to provide a good electrical connection between the conducting portions and the component leads.

The leads 20 and 22 of the capacitor 16 are inserted into the holes 28 and 30 of the circuit board of Fig. 2. The capacitor then forms a bridge between the conducting strips 32 and 34 to complete that portion of the circuit. As shown in the circuit board 20, an electrical component of different shape is shown at 26 and this component may be a resistor or a tubular condenser. As will be observed, since these components are of different shape, it would not be advantageous to use a machine of the same type for attaching both of these components since different functions must be performed in handling the component body and the leads. The tubular component 26 must have the leads bent toward the board whereas the cylindrical component 16 used the leads in the form in which they originally appear with both leads projecting in one direction.

Whereas the present invention is shown and described as utilizing a disc capacitor, it will be recognized that the machine may be readily adapted to handling other types of electrical components which have a similar size and other similar characteristics.

The attaching head for capacitors is shown generally at 36 in Fig. 3. As illustrated, the head is supported on a frame 38. The frame 38 which supports the head may be mounted beside a conveyor which conveys a series of circuit boards past the head. As illustrated, the circuit board shown at 40 may be carried between guide rails 42 and 44 beneath the head for having the component attached thereto. In this manner, a series of boards may be carried beneath the attaching head 36 and as each board is stopped in attaching position beneath the head the head is brought down to attach a cylindrical disc capacitor thereto. A series of heads may be positioned along the path of travel of the circuit boards and the different heads may be adapted to attach different types of capacitors or capacitors of different quantities as well as different types of components so that as the board has transversed its entire path along a series of heads it will have all of the components attached thereto to complete the entire circuit. It will also be seen that the head may be used for individual operation so that the board may be positioned by hand or mechanically beneath the head and one disc capacitor attached thereto or one more may be shifted to a series of different positions beneath the head so that different disc capacitors are attached in different locations on one board.

The head is supported on the supporting frame 38, Fig. 3, by a disc-shaped plate 46 with the head being mounted in the center thereof. This plate has an upper flange 48 which rests on a shoulder 50 in the cylindrical opening of the frame 38. With this arrangement, the head is supported so that it may be rotated within the frame and thus the rotational position of the attachment of the capacitor may be changed by merely changing the rotational position of the head.

A portion of the supporting plate 46 is cut away as illustrated in Fig. 4 to allow for a delivery chute 54 to pass downwardly from a position above the head to feed individual disc capacitors to the attaching mechanism.

The overall head functions to feed the individual capacitors from a magazine and permits them to slide down a delivery chute to the inserting mechanism. The inserting mechanism carries the capacitor downwardly to an attaching position adjacent the circuit board and then forces the leads of the capacitor into the holes on the circuit board whereupon the inserting mechanism again moves upwardly to the return position to receive a new capacitor which is automatically fed.

The operating power mechanism for this apparatus is shown contained in a pneumatic cylinder 56. It will, of course, be recognized that other types of operating mechanism which give a vertical reciprocation can be used.

The pneumatic cylinder 56 as shown in Fig. 3 is provided with air inlets 58 and 60 and a piston slides within the cylinder 56 in response to the admission of pressurized air through the openings 58 and 60. The air is supplied from a suitable source and is controlled by a valve. When air is admitted to the upper opening 60 and vented from the lower opening 58, the air will fill the upper end of the cylinder 56 to force the piston downwardly to move the operating mechanism downwardly.

And, when air is admitted into the lower opening 58 and vented from the upper opening by means of the valve, the piston is raised to carry the operating mechanism upwardly. This operation is automatically controlled by the operation of the valve which may be operated by a cam, in response to a timer, or by electrical valve mechanism or the like which can be controlled by the position of the circuit board or by other suitable mechanism. This pneumatic apparatus with the vertical reciprocating piston operates both the inserting mechanism and the disc capacitor feeding mechanism.

The disc capacitor supply is contained in a supply chamber shown at 62 in Figs. 3 and 4, 5 and 6. The magazine or supply chamber 62 is suitably supported on a vertically extending bracket 61 attached to the plate 46, as is illustrated in Figs. 3 and 4. The inside of the magazine is shaped to contain a stack of components shown at 68 in Fig. 5 in their horizontal position. For this purpose, the interior is cylindrically shaped as illustrated at 64. Projecting from one side of the cylindrically shaped interior is a rectangularly shaped channel illustrated at 66 to accommodate the leads 22 and 20 which project from the body 18 of the disc capacitor as illustrated in Fig. 4. With this magazine or supply chamber, the capacitors may be stacked on top of each other in horizontal position but they will remain oriented since they cannot rotate therein.

The stack of capacitors rests on the floor of the magazine which is supplied by a plate 63 shown in Fig. 5. There is a small space between the floor 63 and the magazine 62 and in this space slides a feeder plate shown at 70 in Fig. 5 which functions to remove the lowermost component from the magazine and drop it into the delivery chute 71.

The feeder plate slides to a receiving position beneath the magazine 62 in the position of Fig. 5 and thereafter is slid into a delivery position as is shown in Fig. 6 and in this position it drops the component 16 down the delivery chute 71. For removing the individual components from the bottom of the stack, the feeder plate is provided with a component opening 72 as illustrated in Fig. 5. This opening has a cylindrical portion 74, Fig. 4, and a slot leading therefrom such as is shown at 76, the slot being substantially the width of the leads which extend from the capacitor. Thus the opening is substantially the shape and size of the opening of the supply chamber so that when it is moved beneath the supply chamber the lowermost component drops into the opening 74. When the feeder plate is slid out from beneath the supply chamber, it is slid in the direction of the leads so that the leads move foremost. When the feeder plate reaches a position such as shown in Fig. 6, which is over the delivery chute 71, the forward end or lead end of the disc capacitor is first positioned over the delivery chute and the capacitor will drop down with the leads foremost in the delivery chute.

The delivery chute is so shaped that the cylindrical components in the position in which they are deposited by the feeder plate cannot turn but are constrained by the chute to slide down in their oriented position. This is accomplished by the shape of the chute shown in the small sectional view of the chute 71 in Fig. 9, as will later be described.

The operation of the feeder plate is achieved by the upper arm 78 of a bell crank 80 which is pivoted at 82 and supported on the plate 46 as shown in Fig. 5. The upper arm 78 of the bell crank projects into a slot 84 in the feeder plate and when the arm 78 is given pivotal movement it slides the feeder plate back and forth between the capacitor receiving position of Fig. 5 and the capacitor delivery position of Fig. 6. The operation for pivotal movement of the bell crank 80 is achieved by the vertical movement of the operating piston and the connection between the bell crank and the piston will be described later.

Figures 8, 9:
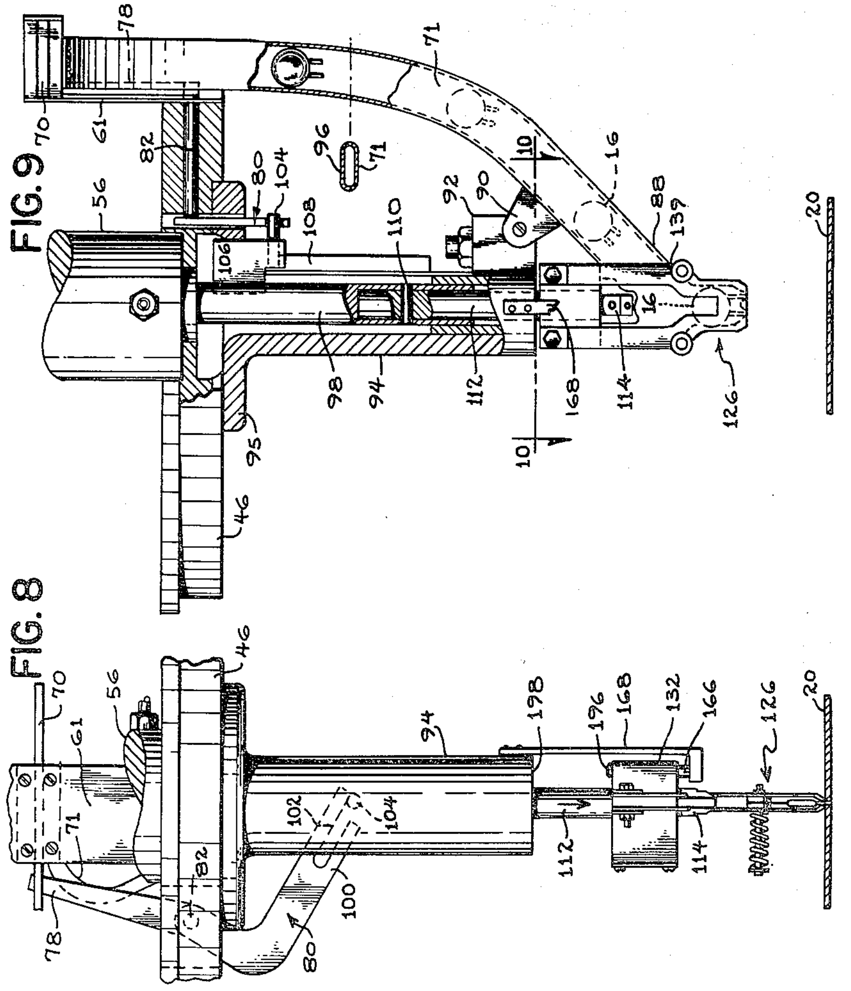
Fig. 8 is a rear elevational view of the mechanism of Fig. 7 but showing the related parts in a different position with the head having descended part way toward the attaching position.
Fig. 9 is a side elevational view of the attaching head with portions broken away to show the internal construction of the mechanism and illustrating the travel of the disc capacitors as they fall down the delivery chute.

The delivery chute 71 has its upper end 86 as is shown in Fig. 5 offset from the magazine 62 so that the capacitor must be moved laterally to be transferred from the lower end of the supply chamber 62 to the upper end of the delivery chute. The chute leads downwardly through a curved path to deliver the component to the inserting mechanism and the lower end 88 of the chute as shown in Figs. 1 and 9 leads to the inserting mechanism. The chute is supported at its upper end by being suitably attached to the base plate 63 of the magazine as is shown in Fig. 5. The delivery chute is further supported by a bracket 90 which is secured, Fig. 9, to a projection 92 which extends from the guide tube 94 for the inserting mechanism. This guide tube 94 has an upper flanged end 95 which is suitably fastened to the plate 46 and this construction will be described later.

It will be noted that as the capacitor 16 is in position at the bottom of the supply chamber 62 in Fig. 5 it is in a horizontal position. When transferred to the delivery chute 71, it rotates about a horizontal axis to a vertical position with the leads pointing downwardly. In accordance with the present construction of the inserter, the capacitors are delivered thereto in a vertical position with the leads pointing downwardly and delivered edgewise in a path parallel to their flat bodies.

To achieve this edgewise delivery, the capacitors, when they moved from the bottom of the supply chamber, as viewed in Fig. 3, are moving in a direction away from the observer. They then slide down the delivery chute 71 and the chute curves so that they move edgewise to the left and are traveling in a plane parallel to the observer in Fig. 3. In this manner, the components are directed to travel in the proper direction for delivery without being unnecessarily handled or twisted thus reducing their chances of becoming jammed within the delivery chute 71.

The components are maintained in their proper orientation by the delivery chute by virtue of its size and shape. As is shown in Fig. 9, the delivery chute is slightly larger than the disc capacitor but is oblong in shape with its longest dimension 96 being slightly larger than the diameter of the disc capacitor and the flat dimension of the chute being slightly larger than the thickness of the disc capacitor. Since the leads project from the base of the disc capacitor, they will prevent it from rotating about a horizontal axis within the chute and thus the capacitor will remain in its proper position as it drops downwardly by gravity through the delivery chute.

The operating mechanism for the attaching head as a whole is best illustrated in detail in Fig. 9. In that figure, the piston rod is shown at 98 where it slides within the guide tube 94 as operated by the piston within the cylinder 56 which is mounted above. As was previously stated, the piston rod operates the inserting mechanism as well as the feeding mechanism. To operate the feeding mechanism by reciprocating the feeder plate, the bell crank 80 must be pivoted.

With reference to Fig. 8, the lower arm 100 of the bell crank is provided with an open slot 102. This slot extends across the end of a pin 104. This pin reciprocates vertically and is secured to the feeder operating bracket 106, Fig. 9, which is properly secured to the piston rod 98. To permit vertical reciprocation of the bracket 106 a slot 108 is cut in the side of the guide tube 94. As the piston rod reciprocates up and down vertically, the lower arm 100 of the bell crank will be pivoted. This arm is connected to the pivotal shaft 82 and as will be seen in Fig. 9 the other end of the shaft is connected to the upper arm 78 of the bell crank. This arm 78, as was previously described in connection with Figs. 5 and 6, extends into a slot 84 in the feeder plate and as it pivots, moves the feeder plate back and forth to transfer the lowermost component from beneath the stack of components in the magazine to drop it into the delivery chute.

The piston rod 98 also operates the inserter mechanism and for this purpose the guide rod 112 is connected by means of a connector 110 to the lower end of the piston rod 98. This guide rod is also slidably mounted within the guide tube 94. The lower end of the guide rod 112 is shown in greater detail in Figs. 11, 12 and 13. The sides of the cylindrical guide rod are cut away at its lower end to form cam faces shown at 116 and 118 in these figures. These cams function to spread the fingers which hold the capacitor before it is inserted in a manner which will be later described.

Figure 11:
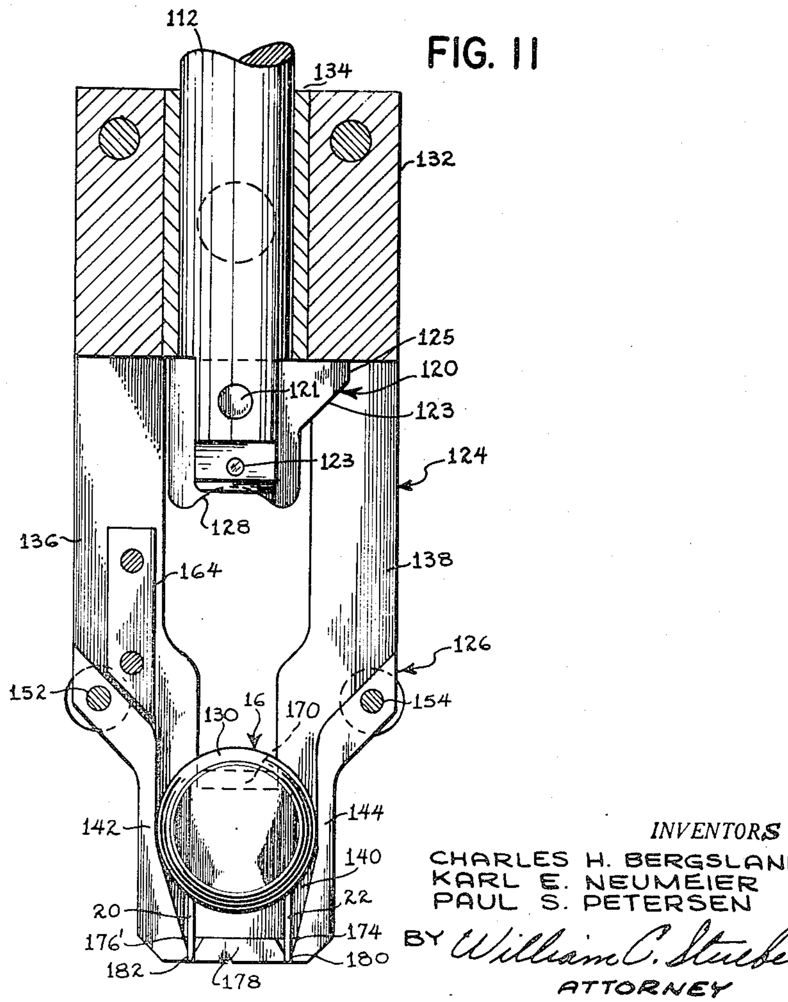
Fig. 11 is an enlarged sectional view taken along line 11—11 of Fig. 8 illustrating the details of the certain elements of the attaching mechanism.
Figure 12:
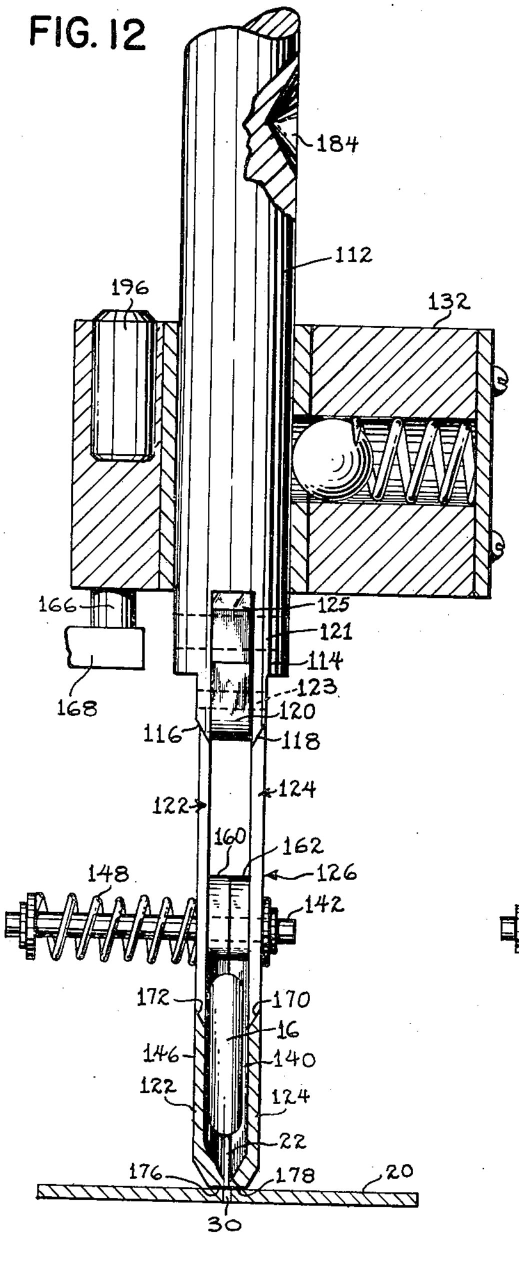
Fig. 12 is a sectional view taken along line 12—12 of Fig. 10.

The lower end of the guide rod 112 is slotted across its center and in this slot is secured a pusher or inserter member 120. To secure the inserter in the slot in the lower end of the guide rod securing pins 121 and 123 project across the slot and hold the inserter 120 in the guide rod. The inserter is provided with a projection 125 and this projection extends between the capacitor guide fingers 122 and 124 as is shown in Figs. 11 and 12. This projection prevents the capacitor guide assembly 126 from rotating with respect to the guide rod. The detail of the capacitor guide assembly 126 will be more fully described later.

The inserter or pusher 120 is also characterized by its lower edge which is rounded and concave as is shown at 128. The edge is shaped so that it will form line contact instead of point contact with the upper rounded edge 130 of the capacitor as illustrated in Fig. 11. Because the capacitor is somewhat fragile in nature it is necessary that it be handled as gently as possible and that no concentrations of stress occur when the capacitor is pushed downwardly by the inserter 120 to force its leads 20 and 22 into the holes in the circuit board. For purposes of protecting the capacitor, the inserter may also be formed of a non-rigid or somewhat resilient material such as nylon which can withstand stress and will retract slightly as the impact shock occurs when the inserter engages the top edge of the capacitor to push it downwardly toward the circuit board.

The capacitor guide assembly 126 is freely suspended for vertical reciprocation at the bottom end of the guide rod. It is prevented from sliding off of the guide rod by a guide assembly block 132 which is shown in Figs. 9 through 13 which rests on top of the inserter 120. Although the guide assembly 126 is free for vertical reciprocation on the guide rod it is prevented from rotating by the projection 125 extending between the guide fingers 122 and 124 as was previously described.

Figure 10:
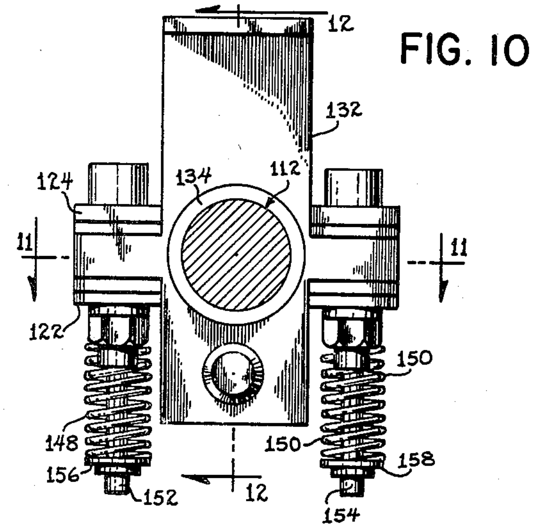
Fig. 10 is a sectional view taken along line 10—10 of Fig. 9 and illustrating the certain enlarged details of construction.
Figure 13:
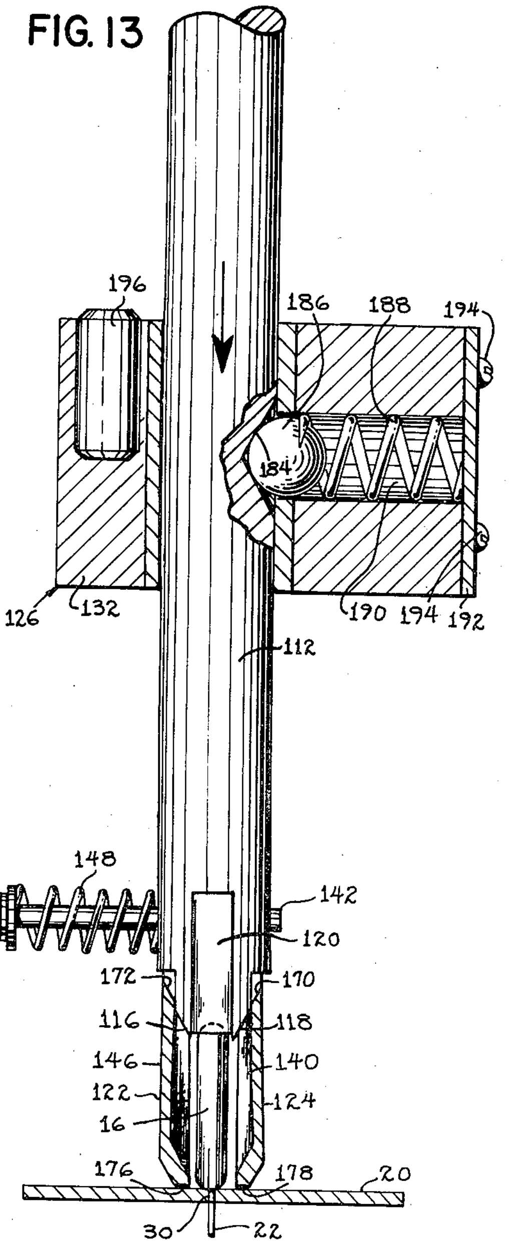
Fig. 13 is a sectional view similar to 12 but illustrating the parts in a different position showing them as they are inserting the capacitor leads into the holes in the circuit board.

For sliding relative to the guide rod, the guide assembly block 132 is provided with a bearing sleeve 134, Figs. 10 and 11. The capacitor guide assembly 126 is movable between two positions on the guide rod, the first being the lowermost or the extended position shown in Figs. 11 and 12 where the capacitor guide assembly rests on top of the inserter 120. In the retracted position, as is shown in Fig. 13, the capacitor guide assembly is moved relatively upwardly on the guide rod 112 or in other words the capacitor guide assembly has been stopped and the guide rod 112 permitted to move downwardly between the capacitor guide fingers. In this downward movement of the rod relative to the guide assembly 126, two functions occur, the first being that the inserter 120 engages the top of the capacitor to force it against the circuit board and the second being that the cam surfaces 116 and 118 spread the guide fingers 122 and 124 to release the capacitor 16.

The two guide fingers 122 and 124 are constructed similarly and arranged to hold the capacitor 16 between them until it can be inserted into the board. Each of the guide fingers such as the one 124 shown in Fig. 11 includes a pair of legs 136 and 138 which are secured at their top end to the guide assembly block 132. At the lower end of these legs is the capacitor supporting end which includes a hollow face 140 to hold the capacitor body. On each side of the hollow face is a flange 142 and 144, the flanges being spaced apart substantially the diameter of the capacitor body to hold it therebetween. With each of the fingers 122 and 124 being similarly constructed each finger has a hollow face, with finger 124 having face 140 and finger 122 having face 146 as is illustrated in Fig. 12.

To clamp the capacitor body between the faces 140 and 146, the legs 136 and 138 which form the upper part of the capacitor guide fingers may be spring biased so as to hold the opposing fingers 122 and 124 together. In addition to this biasing further biasing springs such as 148 and 150 may be provided to hold the guide fingers together. These springs are mounted on spring support pins 152 and 154 as is shown in Fig. 10. The pins are secured at one end in the one guide finger 124 and project freely through openings in the other guide finger 122. The compression springs 148 and 150 expand between the guide finger 122 and spring retaining washers 156 and 158 at the ends of the pins 152 and 154 to cause the fingers to grip the capacitors. Spacing members 160 and 162 as shown in Fig. 12 may be positioned between the capacitor guide fingers to determine their spacing.

It will be noted from Fig. 9 that as the capacitor 16 is delivered to the capacitor guide assembly it enters on the right side of the assembly passing between the leg 138 of the capacitor guide finger 124 and the leg 139 of finger 122. The capacitor then drops downwardly into the position shown in dotted lines in Fig. 9 and shown in full in Fig. 11. A small stop member 164 may be secured to the leg 136 of the capacitor guide finger 124 as illustrated in Fig. 11 to fill the space between the leg 136 and the opposing leg which is on finger 122 to prevent the capacitors from passing completely through between the fingers as they slide down between them from the delivery chute. This prevents losing the capacitor as might possibly occur in some instances as the capacitors strike the fingers when they come down with some velocity slding out of the delivery chute.

Figure 7:
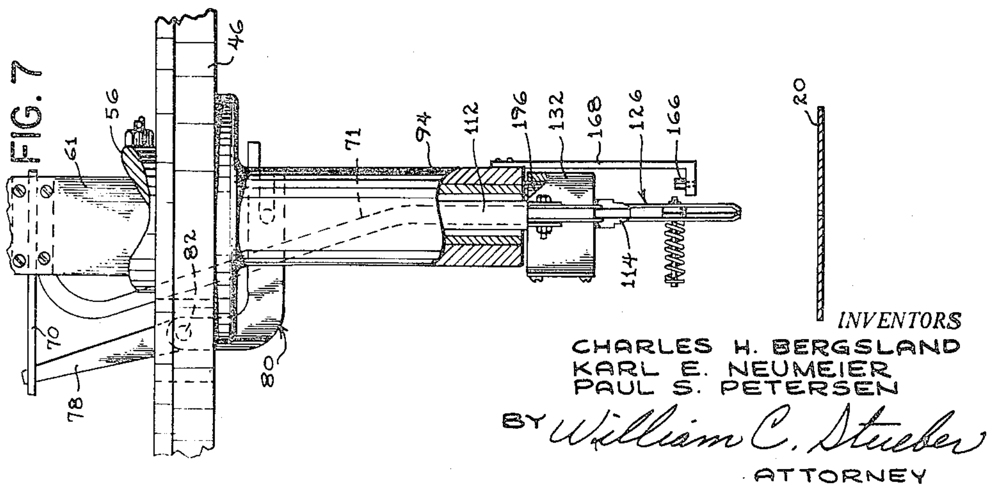
Fig. 7 is a rear elevational view of the capacitor attaching head taken from the direction of line 7—7 of Fig. 3.

In operation, as the piston rod 98 descends, it will carry the guide rod 112 downwardly from the position shown in Fig. 7 to the position shown in Fig. 8. When the guide rod moves downwardly, the capacitor guide assembly 126 also moves downwardly until the guide assembly block 132 strikes the fixed stop 166 as shown in Figs. 8 and 12. The block striking the stop will stop the movement of the capacitor guide assembly causing it to begin to slide relatively upwardly on the guide rod 112. The stop 166 is supported on a downwardly extending bracket 168 which is suitably secured to the guide tube 94. When the capacitor guide assembly is stopped, the fingers 122 and 124 will be in a position just touching the circuit board 20.

It will be noted from Fig. 11 that where the legs 136 and 138 of the guide finger 124 join the lower portion which joins them, there is located a cam follower surface 170. A similar surface 172 is also provided on the other capacitor guide finger 122. These cam follower surfaces are engaged by the cams 118 and 116 respectively to force the guide fingers apart to release the capacitor.

As shown in Fig. 13, the capacitor guide fingers have been forced apart to release the capacitor 16 and as shown in this figure the leads 20 and 22 of the capacitor have been inserted into the holes 28 and 30 in the circuit board 20.

Since the holes in the circuit board are spaced apart a fixed distance it is important in order that the leads of the capacitor will enter the holes, that the leads are spaced apart the same distance as the holes. It is also important that the leads are positioned in the correct location. The circuit board is positioned correctly since the guides 42 and 44 have been provided to give the board the correct location with respect to the head. In order that the capacitor will be positioned accurately within the guide fingers, means are provided to give the correct positioning to the capacitor leads. To accomplish this, sizing funnels 174 and 176′ are provided in the lower edges 176 and 178 of the capacitor guide fingers Fig. 10. These funnels are conical in shape and channel the leads 20 and 22 of the capacitor downwardly. The lower ends of the funnels channel into cylindrical holes 180 and 182 in the fingers and in which the leads 22 and 20 of the component rest while the component is being supported by the guide fingers.

It will be noted from Fig. 12 and from observing the relative position of the inserter 120 and of the cam surfaces 116 and 118 as well as the cam follower surfaces 172 and 170 that the component will be pushed downwardly a short distance within the guide fingers before the cams engage the follower surfaces to spread the fingers. During this short period of travel the leads will be pushed downwardly through the holes 180 and 182 at the base of the guide fingers.

When the capacitor guide assembly is stopped by engaging the stop 166 and the guide rod travels downwardly alone, the inserter 120 engages the top edge 130 of the capacitor 16 forcing it downwardly and the cam surfaces 116 and 118 spread the guide fingers. The guide rod will continue moving downwardly until the leads are inserted completely into the holes in the board as is illustrated in Fig. 13. The guide rod will travel to this position and it will be stopped at this position by controlling the limits of travel of the piston rod in a suitable manner.

It will be noted that in this lowermost insertion position that a detent notch 184 Figs. 12 and 13 in the guide rod 112 will have moved to a position where a detent ball 186 can snap into the notch as it is located in Fig. 13. This detent ball is urged into locking position by a coil compression spring 188 which fits in the cylindrical chamber 190 within the capacitor guide assembly block 132. The spring is held within its chamber by a cap plate 192 which is held in position by screws 194.

The ball 186 snapping into the detent notch temporarily latches the capacitor guide assembly 126 in position relative to the guide rod. Thus, when the guide rod begins ascending, instead of sliding downwardly on the guide rod, the guide assembly block 132 and assembly which it supports will be raised with the guide rod. This insures that the cam surfaces 116 and 118 will remain between the guide fingers 122 and 124 and keep the fingers in a spread position. The capacitor 16 will not be lifted from the board due to the fingers snapping back together as would occur if the guide rod were lifted out from the guide assembly and the cams 116 and 118 were withdrawn from between the cam follower surfaces 172 and 170.

Thus, the guide fingers are maintained in a spread position while they are lifted. To insure that the guide fingers will again be permitted to move back together for receipt of a new capacitor, the capacitor guide assembly is pushed back to its extended position on the guide rod by means of a shock plug 196, which is mounted in the guide assembly block 132, Fig. 7, striking the lower end of the guide tube 94. Thus, the guide assembly 126 will return to its original position and the spring guide fingers will again be brought up to the location of Fig. 1 at the bottom end of the delivery chute for receipt of a new disc capacitor.

The delivery mechanism for the disc capacitors is so timed that a capacitor will be dropped when the guide fingers are moved back to their original position. This, of course, is accomplished by virtue of the delivery mechanism being operated by the piston rod. As the piston rod is lowered and the inserting mechanism and guide assembly perform their insertion operations, the feeder plate which receives a component from the bottom of the stack of the components moves underneath the component stack and a capacitor drops into the opening in the plate. This capacitor is not delivered to the delivery chute until the piston rod again ascends to return the mechanism to its return position.

Although the general operation of the machine is believed to be clear from the previous description, a general summary of operation is as follows.

The delivery mechanism for transferring individual disc capacitors from the supply magazine 62 and the inserting mechanism which attaches a component to the board is operated by the vertical reciprocation of a piston rod 98 shown in Fig. 9. After a component has been attached to the board and the piston rod rises, a new component 16 drops down the delivery chute 71 between the guide fingers 122 and 124. The component is held in place between the lower ends 140 and 146 of the fingers. The component guide assembly shown generally at 126 lowers the component from its position at the lower end 88 of the delivery chute 71 in Figs. 1 and 7 to a position adjacent the circuit board 20 as is shown in Figs. 8 and 12. At that point, the guide assembly block 132 strikes a fixed stop 166 stopping its downward movement. The guide rod 112 continues to move downwardly, however, and the inserter 120 engages the top of the capacitor to push it downwardly. The cam surfaces 116 and 118 which are adjacent the inserter 120 and are part of the guide rod engage the cam followers 170 and 172 to spread the guide fingers and release the capacitor. Continued downward movement of the guide rod forces the capacitor leads into the holes in the circuit board.

The piston rod 98 then reverses its direction of travel and raises the guide rod and the guide assembly. The guide assembly will be raised with the guide rod since it is temporarily latched thereto by a ball 186 resting in a detent notch 184 in the guide rod. This insures that the cam surfaces 116 and 118 will remain between the guide fingers 122 and 124, keeping the guide fingers 122 and 124 spread so that they will lift away from the capacitor and remain free of it so as not to drag it away from the circuit board. When the guide rod approaches its retracted position a shock plug 196 strikes the lower edge 198 of the guide tube 94. This forces the ball 186 out of the detent notch 184 and permits the guide rod to travel to its upward position while the guide assembly slides downwardly thereon. As the guide rod and piston rod reach their uppermost position, the bell crank 80 will have been pivoted back to its return position and as illustrated in Fig. 6 the feeder plate 70 will be slid outwardly to register the opening 72 of the feeder plate with the upper end 86 of the delivery chute 71 to drop a new capacitor down the chute. The capacitor will slide down the chute, be turned to the proper position, and slide between the guide fingers where it will be located for a subsequent attaching operation.

Thus it will be seen that the mechanism provided is capable of successive automatic operations with each operation performing to attach a new disc capacitor to a circuit board in exactly the same manner as the previous one was attached. In this fashion, continuous operations can be performed such as is necessary for high speed machinery.

The mechanism is rugged in construction and has a minimum number of parts so that it is capable of long wear and continued operation. A minimum of adjustments are required and this will contribute to the efficiency of simplicity of operation of the machine. The capacitors remain oriented during their delivery and are accurately and properly positioned above the openings in the circuit board to eliminate poor attachments between capacitor and board. The reliability of the machine is an important feature since it will be recognized that when a single head is used with a plurality of other heads in an assembly line, failure of one head will necessitate shutting down the entire line. It will be understood that although this machine is well suited for handling a disc capacitor, certain features and merits of the invention can be used for other operations and for attaching other types of electrical components.

The machine, although it is capable of rapid operation, is gentle with the components and thus is well adapted to handling disc capacitors. Further, although disc capacitors are by nature of a small size the machine is designed to have parts which are sufficiently large and rugged so as to avoid rapid wear or the danger of breakage.

We have, in the drawings and specification, presented a detailed disclosure of the preferred embodiment of our invention. It is to be understood that the invention is susceptible of modifications, structural changes and various applications of use within the spirit and scope of the invention and we do not intend to limit the invention to the specific form disclosed but intend to cover all modifications, changes and alternative constructions and methods falling within the scope of the principles taught by our invention.

We claim as our invention:

A mechanism for attaching a disc capacitor to a circuit board comprising a pair of opposed guide fingers arranged to support a disc capacitor therebetween and carrying it to a position adjacent the circuit board where the leads of the capacitor may be inserted into holes in the board, spring biasing means positioned to urge the fingers together to support the disc capacitor therebetween, a pusher member arranged to engage the disc capacitor when it has been moved to inserting position adjacent the circuit board and force the capacitor leads into holes in the circuit board, a pair of finger spreading cam surfaces attached to the inserter and movable therewith to spread the fingers and release the capacitor when the inserter engages the disc capacitor to thereby release the capacitor, the fingers mounted on the inserter for movement with the inserter along the path parallel the movement of the inserter, means for moving the inserter toward a circuit board, stop means in the path of the fingers to stop their travel when they have moved the capacitor into inserting position adjacent the circuit board, the pusher member continuing movement to insert the capacitor leads into the board, means to move the pusher away from the circuit board after the capacitor has been attached thereto, and latching means holding the guide fingers in a fixed position relative to the inserter after the capacitor has been inserted to thereby hold the cam surfaces between the guide fingers to maintain them in a spread position while the inserter and the fingers are being moved away from the circuit board and preventing the fingers from dragging the capacitor from the circuit board after the leads have been inserted.

References Cited in the file of this patent

UNITED STATES PATENTS

| | | |
|---|---|---|
| 326,141 | Oaks | Sept. 15, 1885 |
| 922,437 | Marshall | May 18, 1909 |
| 1,140,220 | Wein | May 18, 1915 |
| 1,520,159 | Uttley | Dec. 23, 1924 |
| 1,601,549 | Wurtenberg | Sept. 28, 1926 |
| 1,639,700 | Martin | Aug. 23, 1927 |
| 2,343,496 | Carroll | Mar. 7, 1944 |
| 2,355,832 | Wagner | Aug. 15, 1944 |
| 2,404,480 | Fernald | July 23, 1946 |
| 2,642,111 | Bindszus | June 16, 1953 |
| 2,662,626 | Graham | Dec. 15, 1953 |
| 2,683,924 | Schryver | July 20, 1954 |